(12) United States Patent
Wakao et al.

(10) Patent No.: US 7,320,138 B2
(45) Date of Patent: Jan. 15, 2008

(54) IMAGE AUTHENTICATION APPARATUS, IMAGE AUTHENTICATION METHOD, AND IMAGE AUTHENTICATION PROGRAM

(75) Inventors: Satoru Wakao, Kanagawa (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/667,310

(22) Filed: Sep. 23, 2003

(65) Prior Publication Data
US 2004/0059936 A1  Mar. 25, 2004

(30) Foreign Application Priority Data
Sep. 24, 2002 (JP) .............................. 2002-278216

(51) Int. Cl.
*G06F 17/30* (2006.01)
(52) U.S. Cl. .................. 726/2; 726/4; 726/17; 726/27; 713/155; 713/161; 713/168; 713/169; 713/170; 713/176; 380/229; 380/232; 380/247
(58) Field of Classification Search .................. 726/2, 726/4, 17, 27; 713/176, 155, 161, 168–170; 380/229, 232, 247; 382/100
See application file for complete search history.

(56) References Cited

U.S. PATENT DOCUMENTS

| | | | |
|---|---|---|---|
| 5,499,294 A | 3/1996 | Friedman | 380/10 |
| 6,141,111 A * | 10/2000 | Kato | 358/1.15 |
| 6,968,058 B1 * | 11/2005 | Kondoh et al. | 380/200 |
| 2002/0060736 A1 | 5/2002 | Wakao et al. | |
| 2003/0118211 A1 | 6/2003 | Eguchi et al. | |

\* cited by examiner

*Primary Examiner*—Kim Vu
*Assistant Examiner*—Baotran N. To
(74) *Attorney, Agent, or Firm*—Fitzpatrick, Cella, Harper & Scinto

(57) ABSTRACT

A system classifies an image file into a first group if authentication data included in the image file has been generated using a private key cryptosystem, and classifies the image file into a second group if the authentication data included in the image file has been generated using a public key cryptosystem. The system authenticates whether or not image data included in the image file has been altered using the authentication data. The system displays an indication of whether or not the image data included in the image file has been altered in a display area corresponding to the first group, if the image file is classified in the first group. The system displays an indication of whether or not the image data included in the image file has been altered in a display area corresponding to the second group, if the image file is classified in the second group.

6 Claims, 4 Drawing Sheets

F I G. 3

FIRST WINDOW (WITH MAC)

| THUMBNAIL | FILE NAME | CAMERA ID | AUTHENTICATION RESULT |
|---|---|---|---|
|  | A0001.jpg | 00000001 | NOT ALTERED |
|  | A0002.jpg | 00000001 | ALTERED |
| | | | NUMBER OF FILES : 2 |

SECOND WINDOW (WITH DIGITAL WATERMARK)

| THUMBNAIL | FILE NAME | CAMERA ID | AUTHENTICATION RESULT |
|---|---|---|---|
|  | A0011.jpg | 00000001 | NOT ALTERED |
|  | A0012.jpg | 00000001 | ALTERED |
| | | | NUMBER OF FILES : 2 |

THIRD WINDOW (OTHER DATA)

| THUMBNAIL | FILE NAME | CAMERA ID | AUTHENTICATION RESULT |
|---|---|---|---|
|  | A0021.jpg | — | — |
|  | A0022.jpg | — | — |
| | | | NUMBER OF FILES : 2 |

TOTAL NUMBER OF FILES : 6

FIG. 4

| HEADER | FILE NAME |
| | CAMERA ID |
| | THUMBNAIL IMAGES |
| | OTHER DATA |
| BODY | IMAGE DATA |
| FOOTER | MARKER | AUTHENTICATION DATA (MAC DATA OR DIGITAL SIGNATURE DATA) |

※ MARKER BEFORE THE AUTHENTICATION DATA IS INFORMATION FOR IDENTIFYING THE TYPE OF AUTHENTICATION DATA

IMAGE AUTHENTICATION APPARATUS, IMAGE AUTHENTICATION METHOD, AND IMAGE AUTHENTICATION PROGRAM

FIELD OF THE INVENTION

The present invention relates to an apparatus for examining and authenticating alteration or non-alteration of image data in an image file.

BACKGROUND OF THE INVENTION

Currently, an image authentication system, which examines and authenticates alteration or non-alteration of image data by using Message Authentication Code (MAC) data or digital signature data corresponding to image data in an image file, is proposed. The conventional image authentication system is disclosed in, e.g., U.S. Pat. No. 5,499,294. Note herein that MAC data is obtained by processing a hash value of image data by key data that corresponds to a secret key of a symmetric key cryptography. Digital signature data is obtained by processing a hash value of image data by key data that corresponds to a private key of a public key cryptography.

However, the conventional image authentication system does not provide a user interface that is convenient and easy to use.

SUMMARY OF THE INVENTION

The present invention has been proposed in view of the above problem, and has as its object to provide a user with a user interface that is convenient and easy to use.

According to the present invention, the foregoing object is attained by providing an image authentication apparatus having control means for controlling a classifying process that classifies each image file into a group corresponding to a type of authentication data in each image file, and a displaying process including a process of displaying in display means data related to each image file in group unit.

Furthermore, the present invention provides an image authentication method comprising: a step of controlling a classifying process that classifies each image file into a group corresponding to a type of authentication data in each image file; and a step of controlling a displaying process including a process of displaying in display means data related to each image file in group unit.

Furthermore, the present invention provides an image authentication program comprising: a step of controlling a classifying process that classifies each image file into a group corresponding to a type of authentication data in each image file; and a step of controlling a displaying process including a process of displaying in display means data related to each image file in group unit.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of a screen displayed on a display unit; and

FIG. 4 shows an example of a file format of an image file.

DETAILED DESCRIPTION OF THE PREFERRED EMBODIMENT

A preferred embodiment of the present invention will now be described in detail in accordance with FIGS. 1 to 4.

Figure 1:
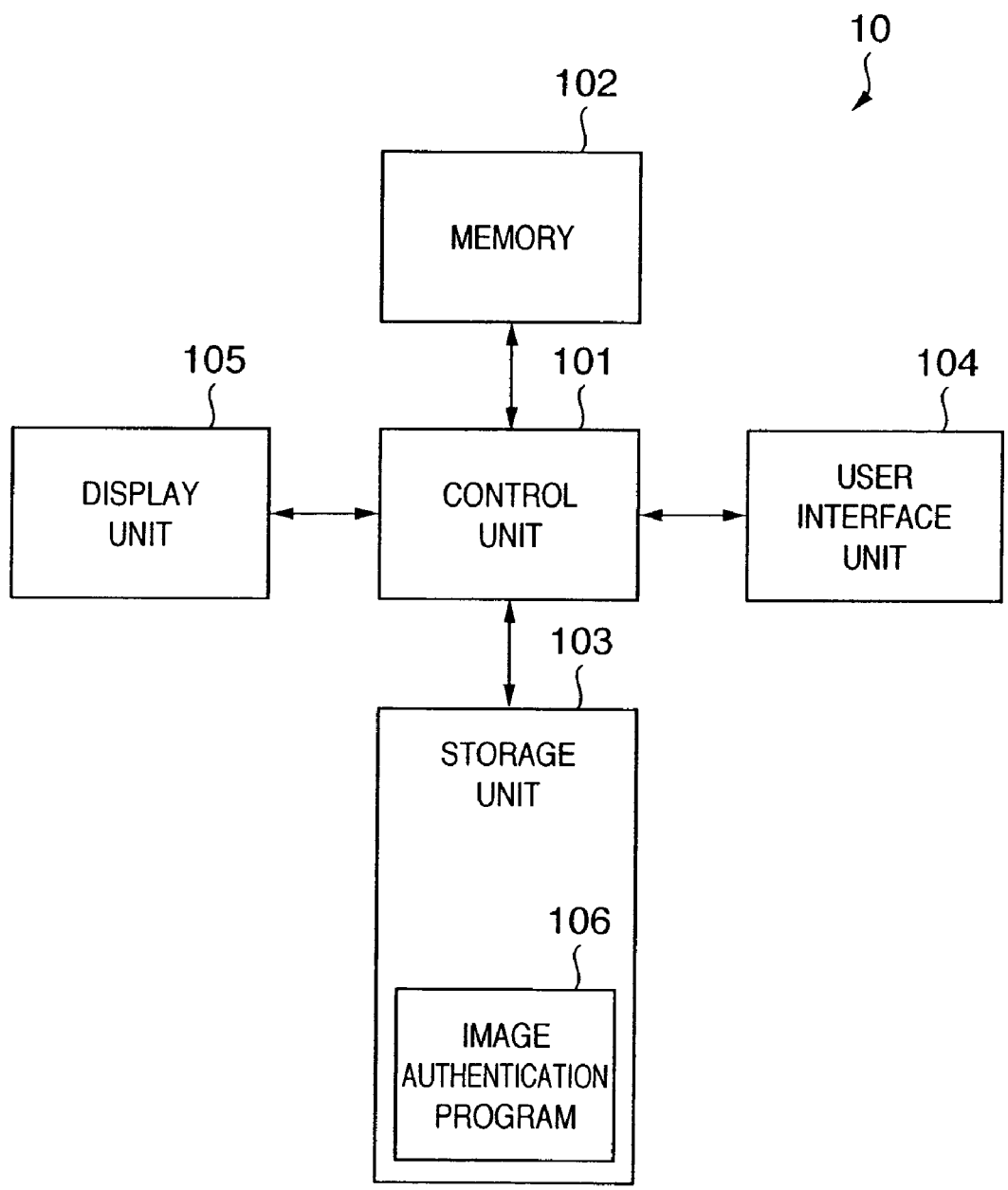
FIG. 1 is a block diagram showing a main construction of an image authentication system according to an embodiment of the present invention.

FIG. 1 is a block diagram showing a main construction of an image authentication system 10 according to the embodiment of the present invention.

Referring to FIG. 1, a control unit 101 controls various functions in the image authentication system 10. Memory 102 stores various data processed by the control unit 101. A storage unit 103 is a memory storing an application program, such as an image authentication program 106 and the like. A user interface unit 104 informs the control unit 101 of a user's designation. A display unit 105 displays data supplied by the control unit 101.

FIG. 3 shows an example of a screen generated by the control unit 101 of the present embodiment in accordance with the image authentication program 106.

Referring to FIG. 3, a screen 300 displays a first window 301, a second window 302, and a third window 303. The screen 300 also displays data indicative of the total number of files displayed on the first window 301, second window 302, and third window 303.

The first window 301 displays a list of information related to an image file that belongs to a first group. The image file that belongs to the first group is an image file having MAC (Message Authentication Code) data as the authentication data for the image data. MAC data is obtained by processing a hash value of image data by key data that corresponds to a secret key of a symmetric key cryptography.

The second window 302 displays a list of information related to an image file that belongs to a second group. The image file that belongs to the second group is an image file having digital signature data as the authentication data for the image data. Digital signature data is obtained by processing a hash value of image data by key data that corresponds to a private key of a public key cryptography.

The third window 303 displays a list of information related to an image file that belongs to a third group. The image file that belongs to the third group is an image file having neither MAC data nor digital signature data as the authentication data for the image data.

FIG. 4 shows an example of a file format of an image file. The image file is constructed with a header, a body, and a footer. Note that an image file having no authentication data (a file displayed in the third window 303) has no footer, or includes a footer having no storage area for authentication data. The header includes a file name of the image, camera ID data which specifies a digital camera that has picked up the image, and thumbnail images. The "other data" includes information related to an image size (the number of pixels in the horizontal and vertical directions), the starting position and size of the body, the starting position and size of the footer, and so forth. The body stores compressed image data (JPEG-encoded image data). The "marker" in the footer is information identifying the type of the authentication data. Accordingly, it is possible to discriminate whether the authentication data is MAC data or digital signature data by examining the "marker". The MAC data is authenticate data obtained by processing a hash value of image data by key data that corresponds to a secret key of a symmetric key cryptography. The Digital signature data is authenticate data obtained by processing a hash value of image data by key data that corresponds to a private key of a public key cryptography. It should be noted that the maker and the authenticate data may be stored in the header instead of in the footer. Furthermore, the marker and the authenticate data may be embedded in the image data using a watermark technology.

Figure 2:
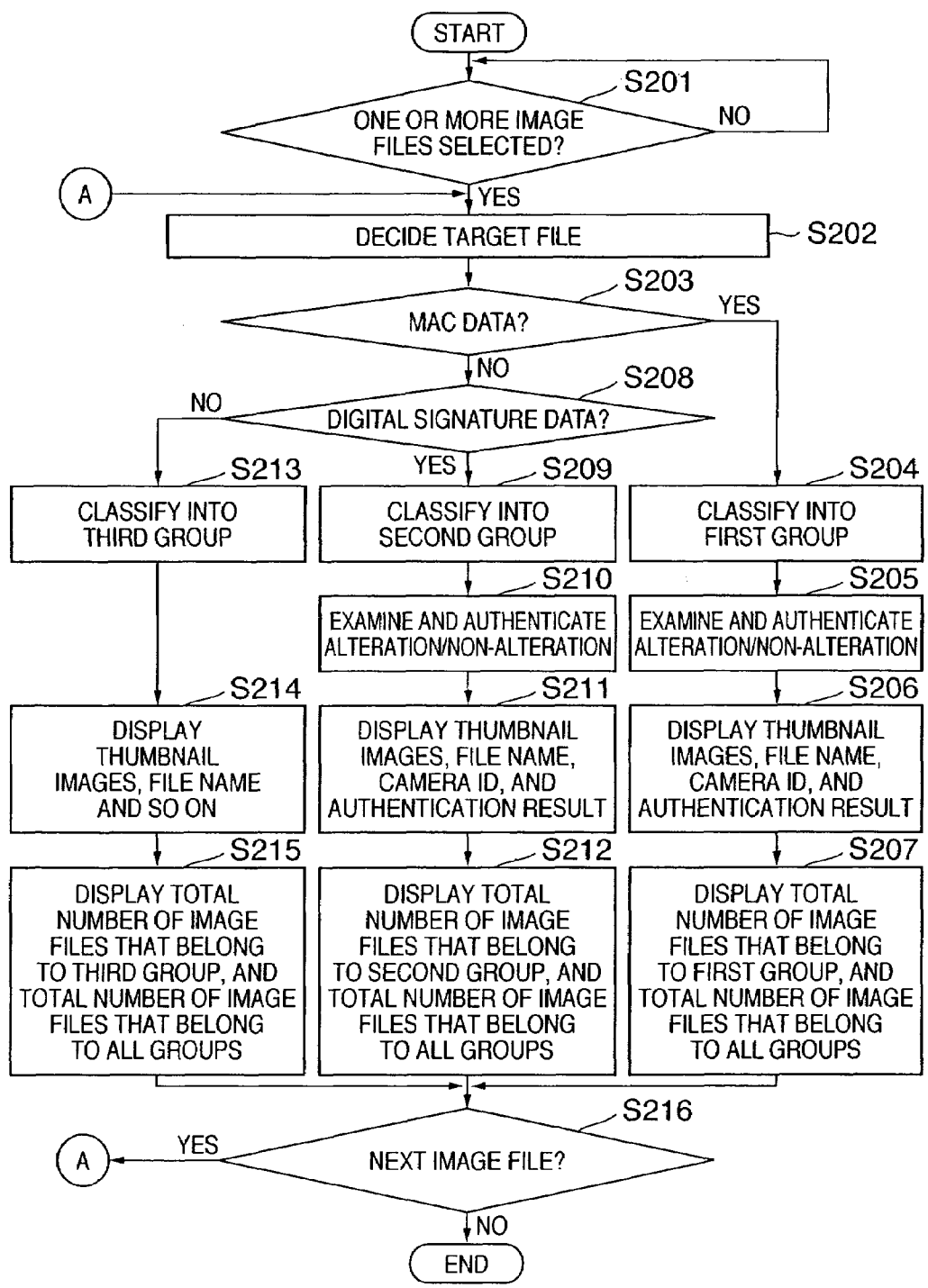
FIG. 2 is a flowchart describing a procedure executed in accordance with an image authentication program by an image authentication apparatus proposed by the embodiment of the present invention.

FIG. 2 is a flowchart describing one of procedures executed in accordance with the image authentication program 106 by the image authentication system proposed by this embodiment. FIG. 2 shows examination procedure executed automatically when a user selects one or more image files.

Step S201: The control unit 101 determines whether or not a user has operated the user interface unit 104 and has selected one folder or one or more files in the storage unit 103. Note that, at this time, thumbnail image, file name and camera ID, i.e., of each selected image file may be displayed. If the thumbnail image, file name or camera ID is displayed when the user selects the image files, it is possible for the user to correctly select image files which he or she want to examine and authenticate. When one folder or one or more files are selected, the control proceeds to step S202.

Step S202: The control unit 101 decides one target file from the one or more image files selected by the user.

Step S203: The control unit 101 determines whether or not authentication data in the target file is MAC data. This determination, for example, is made by examining whether or not the maker in the image file indicates MAC data. When the authentication data is MAC data, the control proceeds to step S204. When the authentication data is not MAC data, the control proceeds to step S208.

Step S204: The control unit 101 classifies the target file into the first group.

Step S205: The control unit 101 examines and authenticates alteration or non-alteration of the image data using the image data in the target file and MAC data in the target file. For example, the control unit 101 compares data, which is obtained by converting the MAC data by predetermined common key data, with a hash value calculated based on the image data (body), thereby performing authentication. If a match is found, the control unit 101 determines non-alteration of the image, but if a match is not found, the control unit 101 determines alteration of the image.

Step S206: The control unit 101 displays altogether in the first window 301, thumbnail images of the target file, a file name, a camera ID indicative of a unique identifier of the digital camera that has generated the target file, and the result of authentication indicative of whether or not the image data in the target file has been altered.

Step S207: The control unit 101 displays the total number of image files that belong to the first group in the first window 301, and displays the total number of image files that belong to the first to third groups in the screen 300.

Step S208: The control unit 101 determines whether or not the authentication data in the target file is digital signature data. When the authentication data is digital signature data, the control proceeds to step S209. When the authentication data is not digital signature data (including in a case where authentication data is not in the target file), the control proceeds to step S213.

Step S209: The control unit 101 classifies the target file into the second group.

Step S210: The control unit 101 examines and authenticates alteration or non-alteration of the image data using the image data in the target file and the digital signature data corresponding to the image data. For example, the control unit 101 compares data, which is obtained by converting the digital signature data in the target image file by predetermined common key data that corresponds to key data of a common key of a public key cryptography, with a hash value calculated based on the image data (body), thereby performing authentication. If a match is found, the control unit 101 determines non-alteration of the image, but if a match is not found, the control unit 101 determines alteration of the image.

Step S211: The control unit 101 displays altogether in the second window 302, thumbnail images of the target file, a file name, a camera ID indicative of a unique identifier of the digital camera that has generated the target file, and the result of authentication indicative of whether or not the image data in the target file has been altered.

Step S212: The control unit 101 displays the total number of image files that belong to the second group in the second window 302, and displays the total number of image files that belong to the first to third groups in the screen 300.

Step S213: The control unit 101 classifies the target file into the third group.

Step S214: The control unit 101 displays altogether in the third window shown in FIG. 3, thumbnail images of the target file, a file name and so forth.

Step S215: The control unit 101 displays the total number of image files that belong to the third group in the third window 303, and displays the total number of image files that belong to the first to third groups in the screen 300.

Step S216: The control unit 101 determines whether or not there is an image file that has yet to be processed. If YES, the control returns to step S201.

As described above, according to the image authentication system 10 of the present embodiment, it is possible to classify an image file designated by a user in accordance with the type of authentication data in the image file, and display the information related to the image file altogether in a window provided for each group. Accordingly, the user can easily be informed of the type of authentication data in each image file.

Furthermore, according to the image authentication system 10 of the present embodiment, it is possible to display thumbnail images of the image file selected by a user, a file name, a camera ID, and the authentication result altogether. Therefore, the user can instantly be informed of the information related to the selected image file.

Accordingly, the present invention can provide a user with a user interface that is convenient and easy to use.

The present invention is not limited to the above embodiment and various changes and modifications can be made within the spirit and scope of the present invention. Therefore, to apprise the public of the scope of the present invention, the following claims are made.

What is claimed is:

1. A system that authenticates whether or not image data included in an image file has been altered, said system comprising:
   a control unit that classifies the image file into a first group
      if authentication data included in the image file has been generated using a private key cryptosystem, and classifies the image file into a second group if the authentication data included in the image file has been generated using a public key cryptosystem, wherein said control unit authenticates whether or not the image data included in the image file has been altered using the authentication data included in the image file, said control unit displays an indication of whether or not the image data included in the image file has been altered in a display area corresponding to the first group, if the image file is classified in the first group, and said control unit displays an indication of whether or not the image data included in the image file has been altered in a display area corresponding to the second group, if the image file is classified in the second group.

2. The system according to claim 1, wherein said control unit displays information related to the image file in a display area corresponding to the first group, if the image file is classified in the first group, and said control unit displays information related to the image file in a display area corresponding to the second group, if the image file is classified in the second group, and wherein the information related to the image file includes at least one of a thumbnail image, a file name, and a camera ID, the camera ID indicating a unique identifier of a digital camera that generated the image file.

3. A method of authenticating whether or not image data included in an image file has been altered, said method comprising the steps of:

classifying the image file into a first group if authentication data included in the image file has been generated using a private key cryptosystem;

classifying the image file into a second group if the authentication data included in the image file has been generated using a public key cryptosystem;

authenticating whether or not the image data included in the image file has been altered using the authentication data included in the image file;

displaying an indication of whether or not the image data included in the image file has been altered in a display area corresponding to the first group, if the image file is classified in the first group; and displaying an indication of whether or not the image data included in the image file has been altered in a display area corresponding to the second group, if the image file is classified in the second group.

4. The method according to claim 3, further comprising the steps of:

displaying information related to the image file in a display area corresponding to the first group, if the image file is classified in the first group, and displaying information related to the image file in a display area corresponding to the second group, if the image file is classified in the second group, wherein the information related to the image file includes at least one of a thumbnail image, a file name, and a camera ID, the camera ID indicating a unique identifier of a digital camera that generated the image file.

5. A computer-readable medium that stores a program for causing a computer to perform a method of authenticating whether or not image data included in an image file has been altered, the method comprising the steps of:

classifying the image file into a first group if authentication data included in the image file has been generated using a private key cryptosystem;

classifying the image file into a second group if the authentication data included in the image file has been generated using a public key cryptosystem;

authenticating whether or not the image data included in the image file has been altered using the authentication data included in the image file;

displaying an indication of whether or not the image data included in the image file has been altered in a display area corresponding to the first group, if the image file is classified in the first group; and displaying an indication of whether or not the image data included in the image file has been altered in a display area corresponding to the second group, if the image file is classified in the second group.

6. The computer-readable medium according to claim 5, wherein the method further comprises the steps of:

displaying information related to the image file in a display area corresponding to the first group, if the image file is classified in the first group, and displaying information related to the image file in a display area corresponding to the second group, if the image file is classified in the second group, wherein the information related to the image file includes at least one of a thumbnail image, a file name, and a camera ID, the camera ID indicating a unique identifier of a digital camera that generated the image file.

* * * * *

UNITED STATES PATENT AND TRADEMARK OFFICE
CERTIFICATE OF CORRECTION

PATENT NO. : 7,320,138 B2
APPLICATION NO. : 10/667310
DATED : January 15, 2008
INVENTOR(S) : Satoru Wakao et al.

It is certified that error appears in the above-identified patent and that said Letters Patent is hereby corrected as shown below:

Col. 3, line 7, "Digital" should read --digital--; and

"authenticate" should read --authentication--.

line 11, "authenticate" should read --authentication--.

line 12, "authenticate" should read --authentication--.

Signed and Sealed this

Fifth Day of August, 2008

JON W. DUDAS
*Director of the United States Patent and Trademark Office*